(12) United States Patent
Kato

(10) Patent No.: US 8,341,847 B2
(45) Date of Patent: Jan. 1, 2013

(54) ROTARY CUTTER FOR MOWER

(75) Inventor: Hiroki Kato, Tokyo (JP)

(73) Assignee: Starting Industrial Co., Ltd., Tokyo (JP)

( * ) Notice: Subject to any disclaimer, the term of this patent is extended or adjusted under 35 U.S.C. 154(b) by 0 days.

(21) Appl. No.: 12/086,392

(22) PCT Filed: Dec. 20, 2006

(86) PCT No.: PCT/JP2006/325437
§ 371 (c)(1),
(2), (4) Date: Jun. 12, 2008

(87) PCT Pub. No.: WO2007/074702
PCT Pub. Date: Jul. 5, 2007

(65) Prior Publication Data
US 2008/0263874 A1 Oct. 30, 2008

(30) Foreign Application Priority Data
Dec. 28, 2005 (JP) ................................. 2005-378873

(51) Int. Cl.
*A01D 34/84* (2006.01)
(52) U.S. Cl. ............................................. 30/276; 30/347
(58) Field of Classification Search .................... 30/276, 30/347; 56/12.7
See application file for complete search history.

(56) References Cited

U.S. PATENT DOCUMENTS

| 4,062,114 A | * | 12/1977 | Luick ............................... 30/276 |
| 4,335,510 A | * | 6/1982 | Close et al. ..................... 30/276 |
| 4,411,069 A | * | 10/1983 | Close et al. ..................... 30/276 |
| 4,825,627 A | * | 5/1989 | Truderung ...................... 56/12.7 |
| 4,924,665 A | * | 5/1990 | Crosley ............................ 56/295 |
| 5,566,455 A | * | 10/1996 | Hagstrom ........................ 30/276 |
| 5,758,424 A | | 6/1998 | Iacona et al. |
| 5,887,348 A | | 3/1999 | Iacona et al. |
| 5,896,666 A | | 4/1999 | Iacona et al. |
| 6,035,511 A | * | 3/2000 | Wood ............................... 29/434 |
| 6,148,523 A | * | 11/2000 | Everts et al. .................... 30/276 |
| 6,347,455 B2 | * | 2/2002 | Brant et al. ...................... 30/276 |
| 6,925,789 B2 | * | 8/2005 | Lin .................................. 56/12.7 |
| 6,928,741 B2 | * | 8/2005 | Proulx et al. .................... 30/276 |

(Continued)

FOREIGN PATENT DOCUMENTS

JP 55-36973 A 8/1980

*Primary Examiner* — Andrea Wellington
*Assistant Examiner* — Omar Flores Sanchez
(74) *Attorney, Agent, or Firm* — Breiner & Breiner, LLC

(57) ABSTRACT

A rotary cutter for a mower for mowing grass and the like with a cord of a desired length extending in a radial direction of a cutting head from the cutting head driven for rotation through a drive shaft is described. The rotary cutter includes at least one fastening element for fixing one end of the cord to a cutting head main body. An inner end portion of the cord inserted from a sidewall of the head main body is fastened by the fastening element. The cord is removed and replaced with a new cord when the cord is worn out. The cord fastening element is disposed near a drive shaft coupling shaft tube portion in the cutting head main body. A cord outlet for removing the cord is provided to the drive shaft coupling shaft tube portion side. The inner end portion of the cord extends outside from the cord outlet and along a sidewall of the drive shaft coupling shaft tube portion of the cutting head main body.

1 Claim, 4 Drawing Sheets

U.S. PATENT DOCUMENTS

| | | | |
|---|---|---|---|
| 6,944,956 B1 * | 9/2005 | Fogle | 30/347 |
| 6,983,543 B2 * | 1/2006 | Fogle | 30/347 |
| 7,000,324 B2 * | 2/2006 | Fogle | 30/276 |
| 2008/0083120 A1 * | 4/2008 | Alliss | 30/276 |
| 2009/0031567 A1 * | 2/2009 | Fogle | 30/276 |

* cited by examiner

ROTARY CUTTER FOR MOWER

TECHNICAL FIELD

The present invention relates to a rotary cutter for a mower used for mowing grass, lawn, and the like with a cord of a desired length extending in a radial direction of a cutting head driven for rotation by a motor or the like through a drive shaft and, more particularly, to a rotary cutter for a mower, in which the cord can be removed and easily replaced with a new cord when the cord is worn out.

BACKGROUND ART

As this type of rotary cutter, there is conventionally proposed one including a cutting head formed of a disk-shaped base plate having at its center a drive shaft coupling portion and provided at its outer periphery with a sidewall and a substantially cylindrical protecting cover detachably mounted to the sidewall to face the base plate. Inside the cutting head, fastening means for fastening a cord of a desired length and for mowing grass, lawn, and the like by rotation is provided to the disk-shaped base plate. The fastening means presses and fixes the cord onto a pressing wall provided to the sidewall of the base plate by an elastic member such as a coil spring and a torsion spring and a fastening member in a shape of a cam, a cylindrical rod, or the like (see Patent Document 1).

There is also a known rotary cutter, as shown in FIGS. 3 and 4, including a disk-shaped cutting head main body 10 formed of a case 10-1 having a drive shaft coupling shaft tube portion 10-1a at its central portion and a cover 10-2 having a through hole 10-2a for the drive shaft coupling shaft tube portion 10-1a at its central portion and paring up with the case 10-1. At an outer peripheral end portion of the cutting head main body 10, fastening means 11 for fastening cords 12 of desired length are provided. When the cord 12 of the desired length inserted into the cutting head main body 10 is worn out, the cord is removed from the cutting head main body 10 and replaced with a new cord. Each of the cord fastening means 11 of the rotary cutter is disposed in a cord guide 11-1 provided in an opening formed in a sidewall of the cutting head main body 10 and is formed of a pair of ratchets 11-2, each of the ratchets being constantly applied with a rotational force in a certain direction by a spring 11-3 pivoted for turning on and mounted from outside to a support shaft 10-3 protruding from the cover 10-2 of the cutting head main body 10 to fasten the cover 10-2 and the case 10-1 together by using a fastening screw 12. In other words, in the cord fastening means 11, one end of the cord 12 of the desired length inserted into the cutting head main body 10 from a cord lead-out outlet (cord guide) 11-1 is clamped and fastened by the pair of ratchets 11-2. Therefore, in the case of this rotary cutter, a space 10-4 for holding the code 15 to remove and replace it is provided between the ratchets 11-2 and the drive shaft coupling shaft tube portion 10-1a at the central portion of the cutting head main body.

A drive shaft 13 of the cutting head main body 1 is mounted by a coupling bolt 15 through a lid body 14 covering a bottom portion of the cutting head main body 11 as shown in FIG. 3.

Patent Document 1: Japanese Patent Application Laid-open No. 10-98931

DISCLOSURE OF INVENTION

However, in the case of the rotary cutter described in the above-described Patent Document 1, to replace the worn-out cord with a new cord, the cover of the cutting head main body having the drive shaft coupling portion has to be detached before each replacement and the worn-out cord is taken out and the new cord is mounted, which makes replacement work of the cord troublesome.

In the case of the rotary cutter shown in FIGS. 3 and 4, unlike the rotary cutter described in the Patent Document 1, the cutting head need not be disassembled to replace the worn-out cord with a new cord. However, the space 10-4 for holding the worn-out cord 15 to remove it need to be provided between the ratchets 11-2 and the drive shaft coupling shaft tube portion 10-1a at the central portion of the cutting head main body and therefore, the cutting head itself is forced to increase in outside diameter and also in weight and a mower main body to be mounted with the cutting head is also forced to increase in size.

The present invention has been made especially to overcome the drawback of the above-described prior-art rotary cutter shown in FIGS. 3 and 4 and it is an object of the invention to provide a rotary cutter for a mower, which can be reduced in size and weight and in which cord replacement workability can be improved.

A rotary cutter for a mower according to the present invention is a rotary cutter for a mower for mowing grass, lawn, or the like with at least one cord of a desired length extending in a radial direction of a cutting head from the cutting head driven for rotation through a drive shaft. The rotary cutter includes at least one fastening means for fixing one end of the cord to a cutting head main body having a case and a cover. An inner end portion of the cord inserted from a sidewall of the head main body is fastened by the fastening means. The cord is removed and replaced with a new cord when the cord is worn out. The cord fastening means is disposed near a drive shaft coupling shaft tube portion in the cutting head main body. A cord outlet for removing the cord is provided to the drive shaft coupling shaft tube portion. The inner end portion of the cord extends outside from the outlet for removing the cord and along a sidewall of the drive shaft coupling shaft tube portion of the cutting head main body.

The cord fastening means includes a pair of ratchets. Each ratchet is pivoted for turning on the cutting head main body and constantly applied with a rotational force in a certain direction by a spring. The cord is clamped and fastened by the ratchets.

Furthermore, a cord guide having a groove-like sectional shape is formed to protrude from the sidewall of the drive shaft coupling shaft tube portion.

EFFECT OF INVENTION

The rotary cutter for the mower according to the invention is the rotary cutter for the mower for mowing grass, lawn, or the like with at least one cord of the desired length extending in the radial direction of the cutting head from the cutting head driven for rotation through the drive shaft. The rotary cutter includes at least one fastening means for fixing one end of the cord to the cutting head main body having the case and the cover. The inner end portion of the cord inserted from the sidewall of the head main body is fastened by the fastening means. The cord is removed and replaced with the new cord when the cord is worn out. The cord outlet for removing the worn-out cord from the cutting head in cord replacement is provided to the drive shaft coupling shaft tube portion of the cutting head main body. The inner end portion of the cord extends outside from the cord outlet and along the sidewall of the drive shaft coupling shaft tube portion of the cutting head main body and the cord is mounted to the cutting head for use.

In the cord replacement, the worn-out cord can be removed by holding the portion of the cord extending outside from the cord outlet, which not only improves cord replacement workability but also makes the space for holding the worn-out cord to remove it unnecessary. As a result, the cutting head itself can be reduced in size and weight and mounted to a mower of a small engine displacement.

Figure 1:
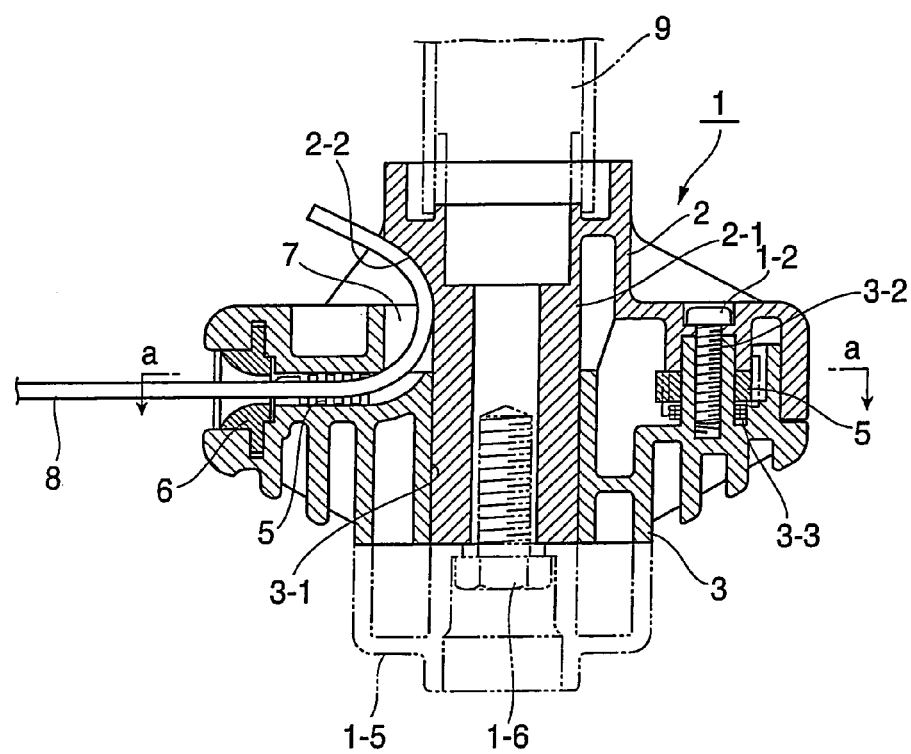
FIG. 1 is a vertical sectional front view showing an embodiment of a rotary cutter for a mower according to the present invention.

DESCRIPTION OF REFERENCE NUMERALS 1 cutting head main body
1-2 fastening screw
2 case
2-2 cord guide arc-shaped face
3 cover
3-1 through hole
3-2 support shaft
3-3 spring
3-4 cord guide
4 cord fastening means
5 ratchet
6 cord guide
7 outlet for removing cord
8 cord
9 drive shaft

BEST MODE FOR CARRYING OUT THE INVENTION

Figure 2:
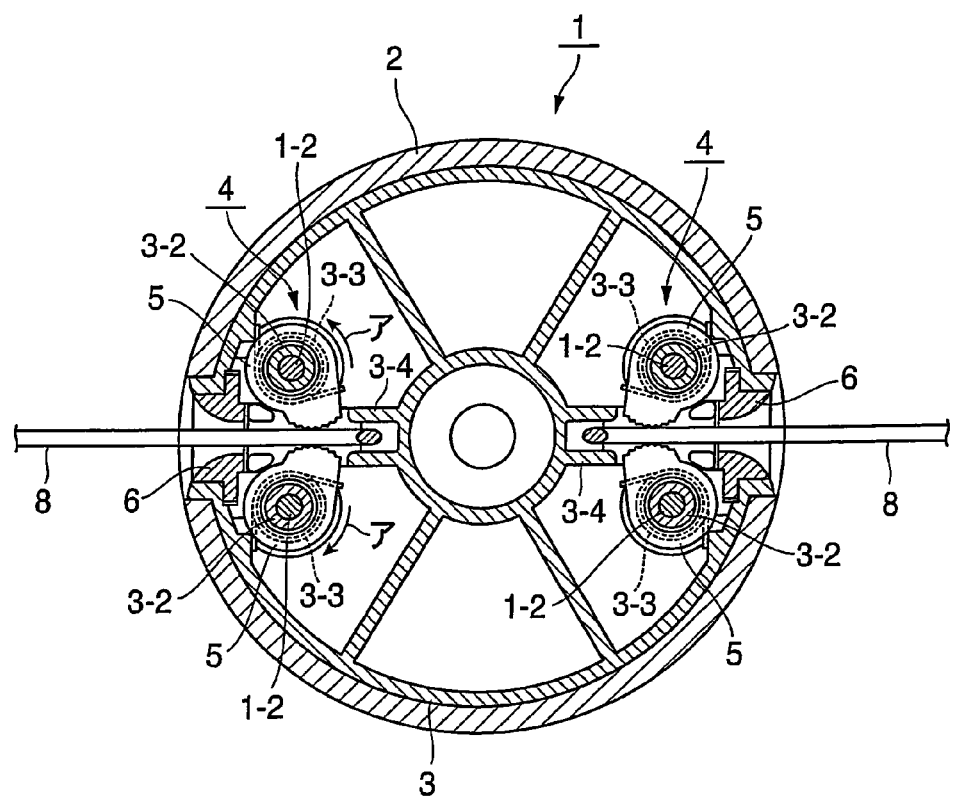
FIG. 2 is a cross-sectional plan view along a line a-a in FIG. 1.
Figure 3:
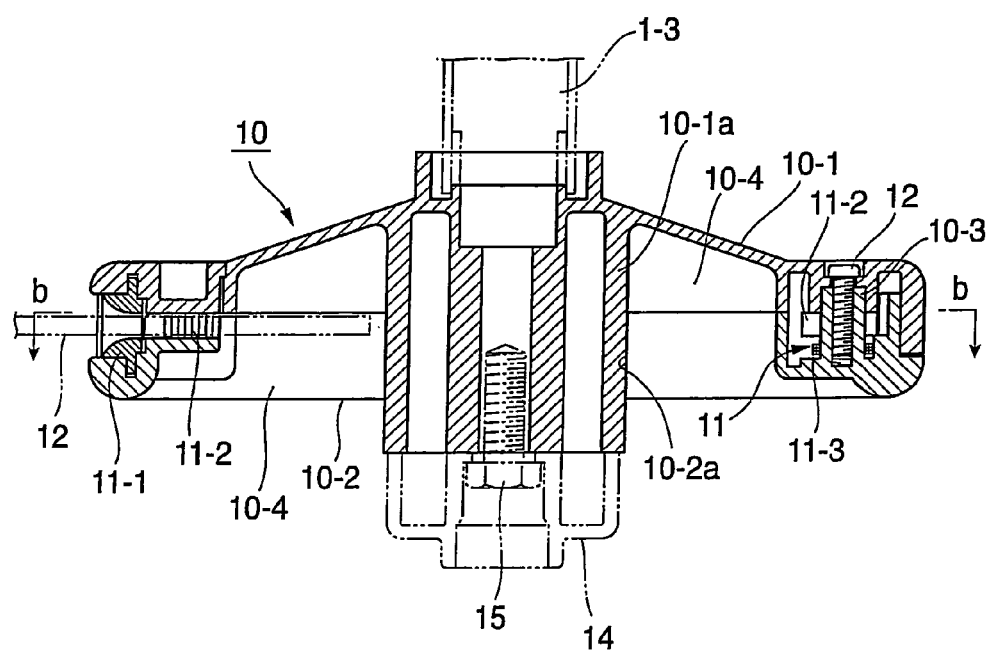
FIG. 3 is a vertical sectional front view showing an embodiment of a prior-art rotary cutter for a mower targeted by the invention.
Figure 4:
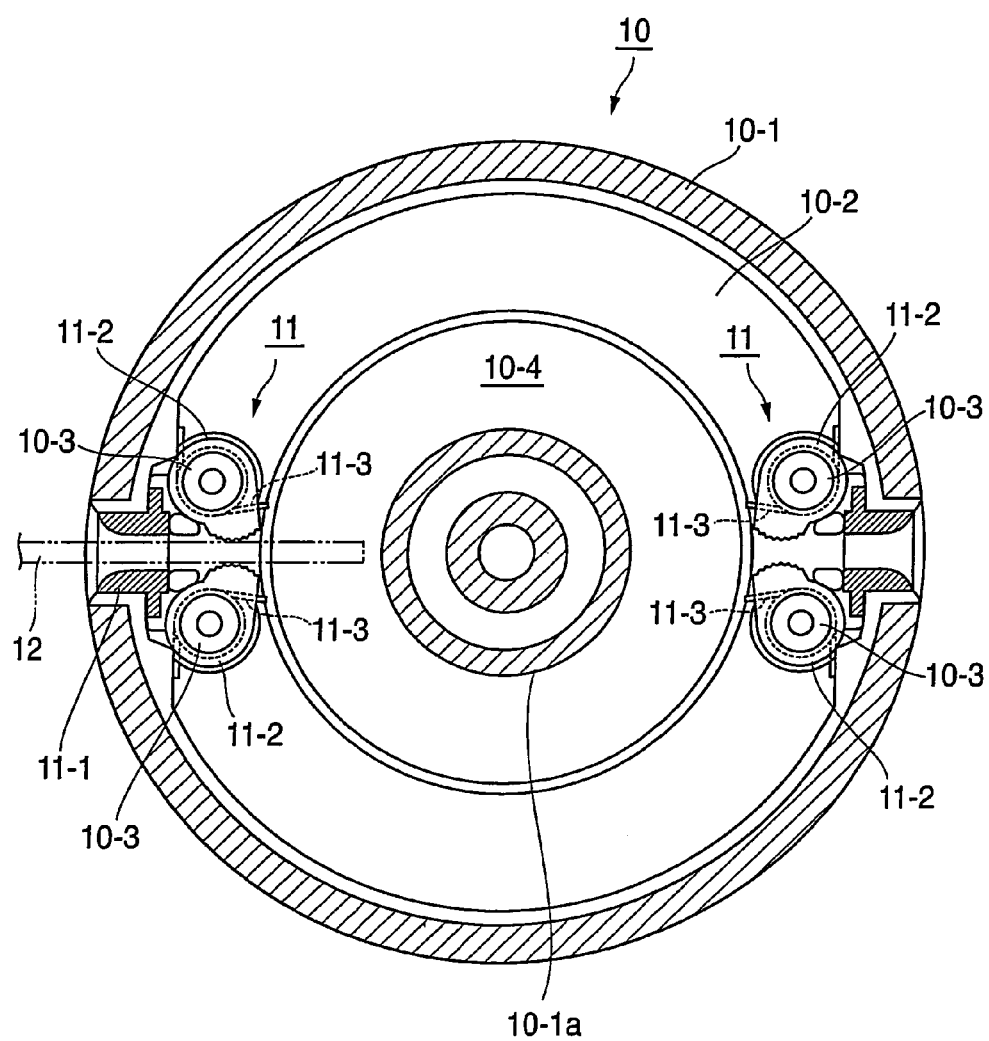
FIG. 4 is a cross-sectional plan view along a line b-b in FIG. 3.

FIG. 1 is a vertical sectional front view showing an embodiment of a rotary cutter for a mower according to the present invention and FIG. 2 is a cross-sectional plan view along a line a-a in FIG. 1, wherein a reference numeral 1 designates a cutting head main body, 2 designates a case, 3 designates a cover, 4 designate cord fastening means, 5 designate ratchets, 6 designate cord guides, 7 designates an outlet for removing cords, 8 designate cords, and 9 designates a drive shaft, respectively.

In other words, the rotary cutter for the mower shown in FIGS. 1 and 2 includes the circular cutting head main body 1 formed of the case 2 having a drive shaft coupling shaft tube portion 2-1 at its central portion and the cover 3 having a through hole 3-1 for the drive shaft coupling shaft tube portion 2-1 at its central portion and paring up with the case 2. At an outer peripheral end portion of the cutting head main body 1, the fastening means 4 (two fastening means, here) for fastening the cords 8 of desired length are provided. The cord fastening means 4 are provided near the drive shaft coupling shaft tube portion 2-1 and have similar structures to the prior-art means. In other words, each of the cord fastening means 4 is disposed inside the cord guide 6 provided in an opening portion formed in a sidewall of the cutting head main body 1 to be sandwiched between the case 2 and the cover 3 and is formed of a pair of ratchets 5, each of the ratchets 5 being constantly applied with a rotational force in a certain direction by a spring 3-3 pivoted for turning on and mounted from outside to a support shaft 3-2 protruding from the cover 3 of the cutting head main body 1. In other words, in the cord fastening means 4, one end of the cord 8 of the desired length inserted into the cutting head main body 1 from the cord guide 6 is clamped and fastened by the pair of ratchets 5, each of the ratchets 5 being applied with the rotational force in the certain direction by the spring 3-3. The case 2 and the cover 3 are integrally coupled by fastening screws 1-2 passing through the case 2 and screwed into the four support shafts 3-2 to which the respective ratchets 5 of the pairs are mounted.

Moreover, in the invention, the cord outlet 7 for removing the cord is provided on the drive shaft coupling shaft tube portion 2-1 side of each of the cord fastening means 4. A sidewall portion of the drive shaft coupling shaft tube portion 2-1 corresponding to each of the cord outlets 7 is formed with the cord guide 3-4 having a groove-like sectional shape and a cord guide arc-shaped face 2-2. The cord guides 3-4 are formed on the cover 3 side of the cutting head main body 1 and the cord guide arc-shaped faces 2-2 are formed at a neck portion of the drive shaft coupling shaft tube portion 2-1 on the case 2 side.

In carrying out operation with the rotary cutter for the mower having the above structure, the drive shaft coupling shaft tube portion 2-1 of the cutting head main body 1 is mounted to the drive shaft 9. The portion 2-1 is mounted by a coupling bolt 1-6 through a lid body 1-5 for covering a bottom portion of the cutting head main body 1 as shown in FIG. 1. One end portion of each of the cords 8 of desired length is inserted from the cord guide 6 provided in the opening formed in the sidewall portion of the cutting head main body 1 and is guided inside. It passes between the pair of ratchets 5, passes through the cord outlet 7 for removing the cord, and changes direction into a substantially U shape along the cord guide 3-4 formed on the sidewall portion of the drive shaft coupling shaft tube portion 2-1 and having the groove-like sectional shape, and the cord guide arc-shaped face 2-2 formed at the neck portion of the drive shaft coupling shaft tube portion 2-1. Thus, the inner end portion of the cord 8 is led out of the cutting head 1. When the cord 8 passes between the pair of ratchets 5, in the case of the ratchets 5 shown in FIG. 2, the cord 8 rotates the ratchets 5 in directions of arrows A against biasing forces of the springs 3-3 and the cord 8 that has stopped in a predetermined position is fastened and fixed between the pair of ratchets 5 by the biasing forces of the springs 3-3. A length of the cord 8 extending from the cord outlet 7 for removing the cord may be such a length that the cord can be held in the cord replacement.

In the cutting head 1 for rotating in either direction after the cords 8 are mounted to the cutting head 1, the fastening forces of the ratchets 5 applied on the cords 8 increase due to centrifugal force produced by rotation of the cutting head 1 and therefore the cords 8 are clamped more firmly.

To replace the cord 8 when the cord 8 is worn out, the inner end portion of the cord led out of the cutting head 1 is held, pulled out, and removed. When the worn-out cord 8 is removed, a new cord 8 is inserted from the cord guide 6 provided in the opening formed in the sidewall portion of the cutting head main body 1 and fixed by the pair of ratchets 5 with its inner end portion extending outside the cutting head from the cord outlet 7 for removing the cord to thereby finish the replacement work.

INDUSTRIAL APPLICABILITY

In the rotary cutter for the mower according to the invention, in which the inner end portion of the cord inserted from the sidewall of the head main body is fastened by the fastening means and the cord is removed and replaced with the new cord when the cord is worn out, the cord outlet for removing the worn-out cord from the cutting head in cord replacement is provided on the side of the drive shaft coupling shaft tube portion of the cutting head main body. The cord is mounted to the cutting head by extending the inner end portion of the cord outside from the cord outlet and along the sidewall of the drive shaft coupling shaft tube portion of the cutting head main body to carry out mowing operation. In the cord replacement, the worn-out cord can be removed by holding the portion of the cord extending outside from the cord outlet, which not only improves cord replacement workability but also makes the space for holding the worn-out cord to remove it unnecessary. As a result, the cutting head itself can be reduced in size and weight and mounted to a mower of a small engine displacement, which makes the rotary cutter extremely practical.

The invention claimed is:

1. A rotary cutter for a mower comprising at least one cord of a predetermined length extending in a radial direction of a cutting head from the cutting head driven for rotation through a drive shaft, at least one fastening means for fixing one end of the at least one cord to a cutting head main body including a case and a cover, wherein the fastening means includes a pair of ratchets, each ratchet pivoted for turning on the cutting head main body and constantly applied with a rotational force in a predetermined direction by a spring, and the cord is clamped and fastened by the pair of ratchets, an inner end portion of the cord inserted from a sidewall of the cutting head main body being fastened by the fastening means, and the cord being removed and replaced with a new cord when the cord is worn out, wherein the fastening means is disposed near a drive shaft coupling shaft tube portion in the cutting head main body, a cord outlet for removing the cord is provided on a side of the drive shaft coupling shaft tube portion so as to be along an axis line of the drive shaft coupling shaft tube portion, and the inner end portion of the cord extends outside from the cord outlet and along an axial direction of a sidewall of the drive shaft coupling shaft tube portion of the cutting head main body, wherein a grooved and sectional-shaped cord guide is formed to protrude from the side of the drive shaft coupling shaft tube portion in a radial direction of the drive shaft coupling shaft tube portion along the axis line of the drive shaft coupling shaft tube portion so as to remove the cord in a direction common to a cord inserting direction, and wherein in operation, the inner end portion of the cord extends outside and in advance of the grooved and sectional-shaped cord guide for removing the cord and along the sidewall of the drive shaft coupling shaft tube portion and is also kept in such state that the inner end portion of the cord is free and exposed so that the inner end portion can be held, and during cord replacement, the cord is removed by holding the inner end portion of the cord as it is which extends outside the grooved and sectional-shaped cord guide and then pulling the inner end portion out of the cutting head main body.

* * * * *